United States Patent Office 3,331,511
Patented July 18, 1967

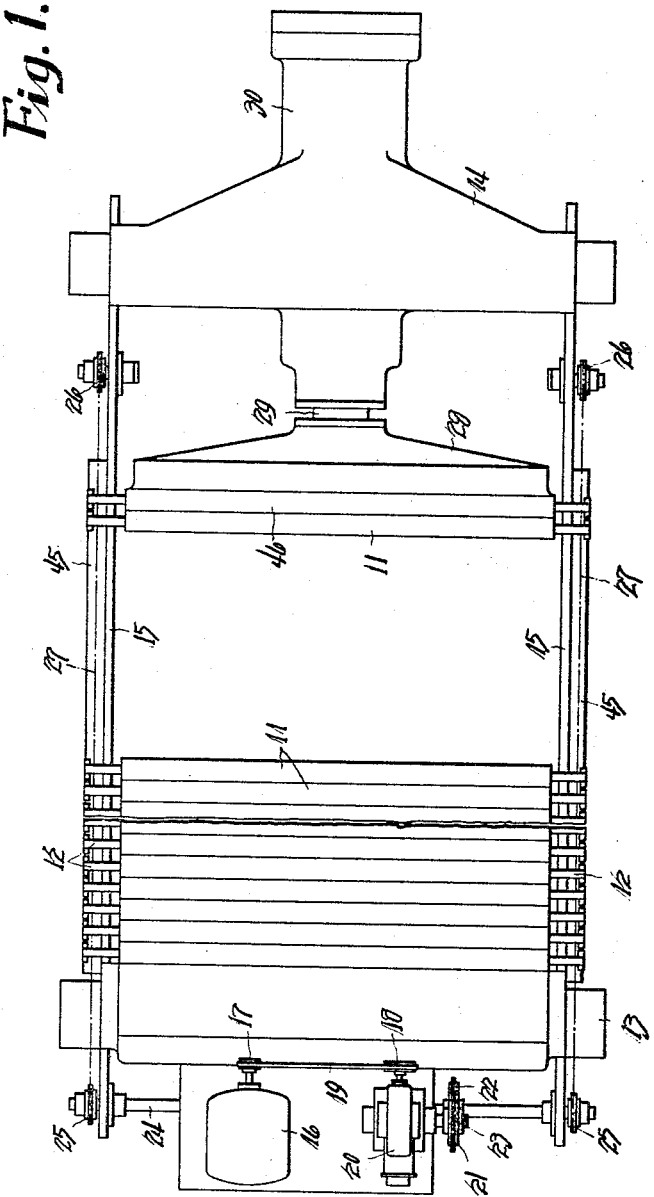

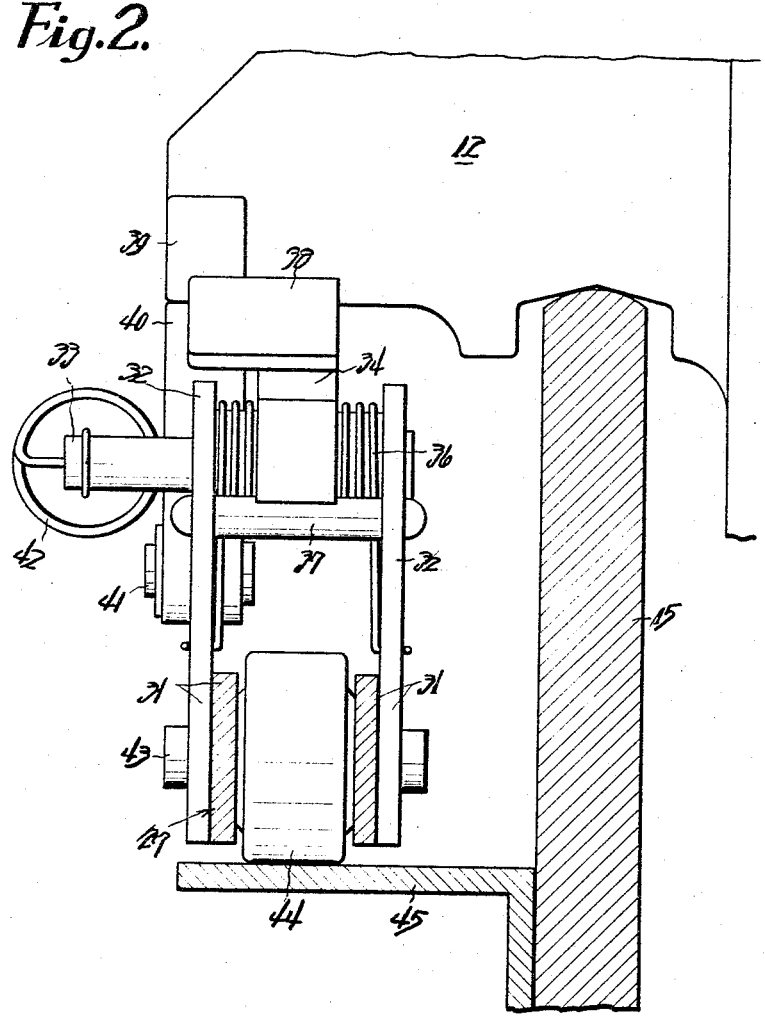

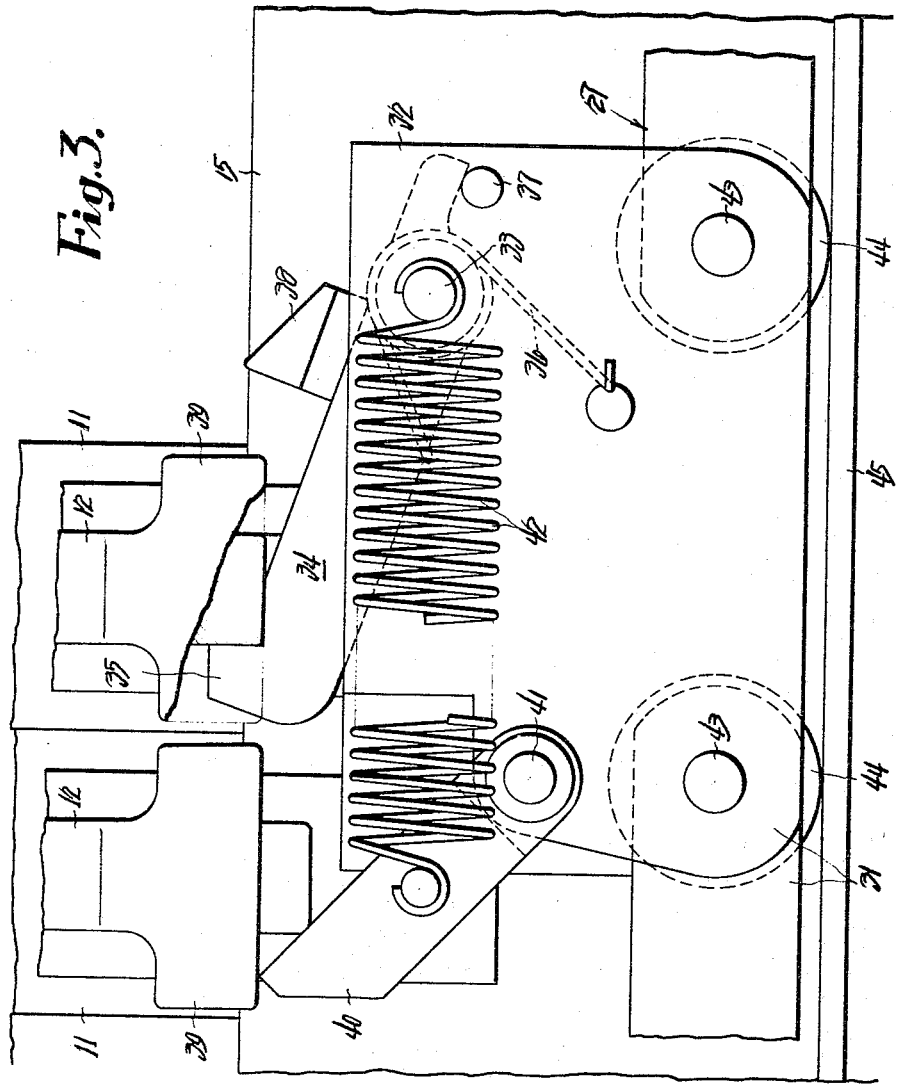

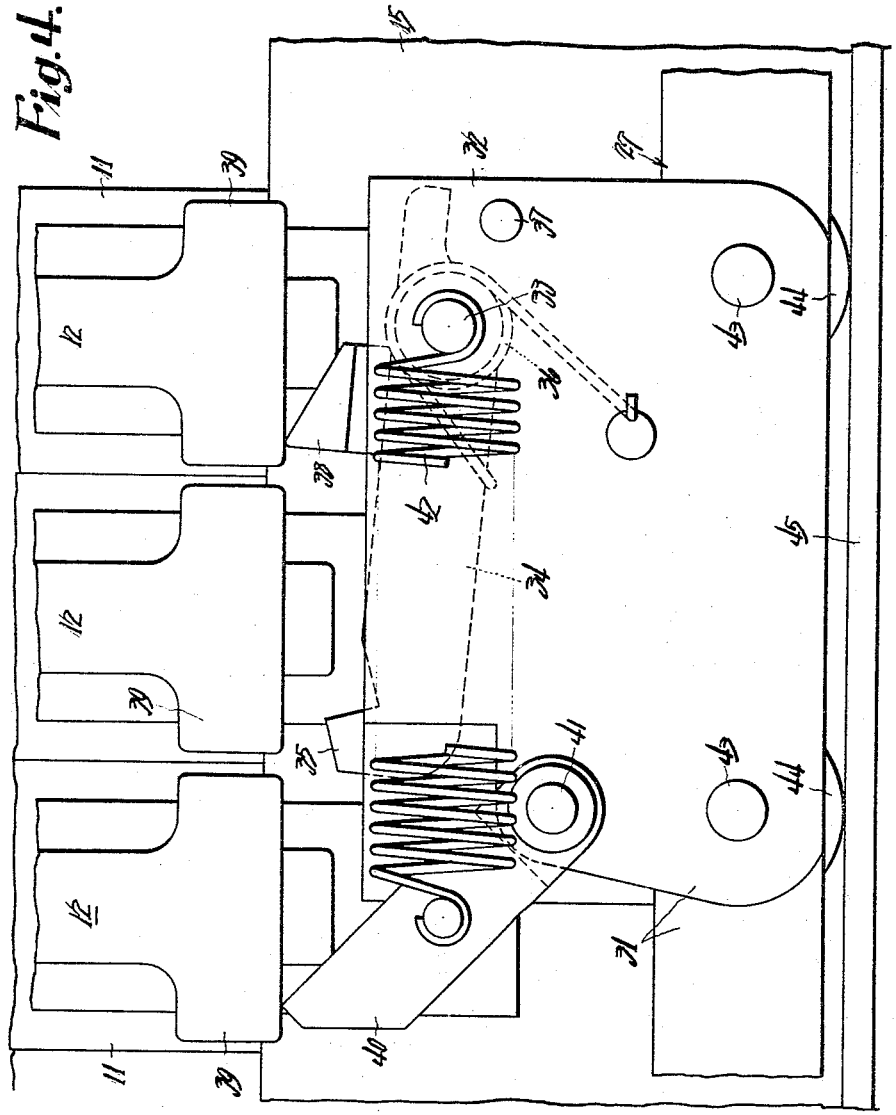

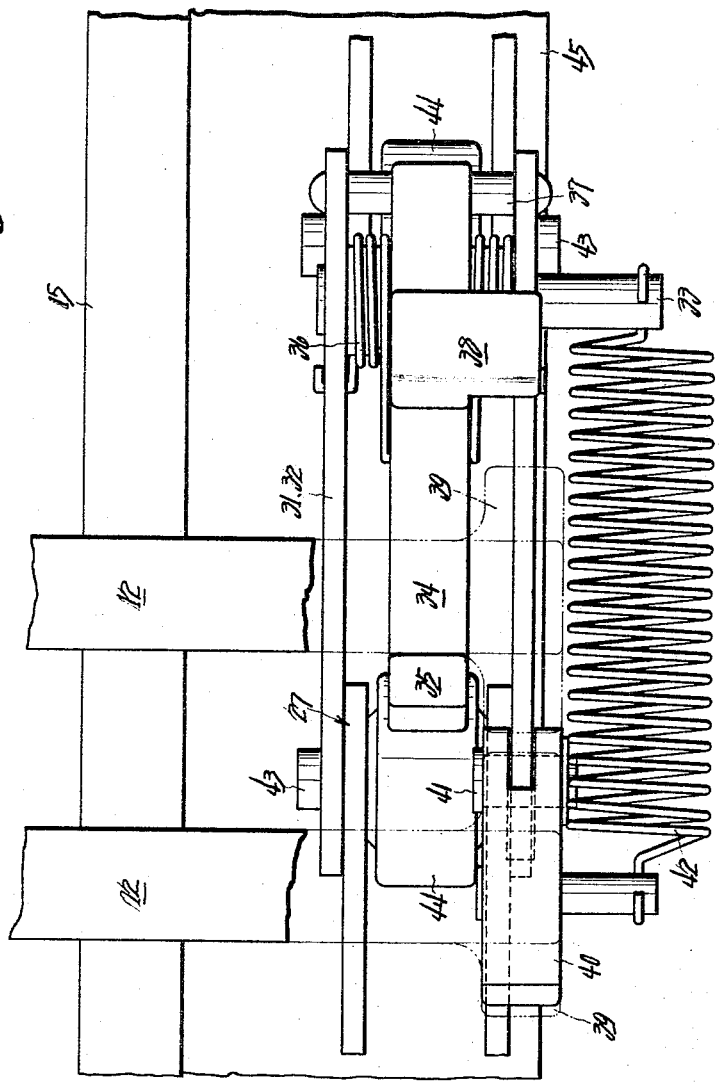

3,331,511
AUTOMATIC FILTER PLATE MOVING APPARATUS IN A FILTER PRESS
Ken-ichiro Kurita, 35, 438 Oaza Senriyama, Suita, Japan
Filed Oct. 19, 1964, Ser. No. 404,604
Claims priority, application Japan, June 9, 1964, 39/32,739
2 Claims. (Cl. 210—230)

This invention relates to an automatic filter plate moving apparatus in a filter press, more particularly to that in that type of a filter press wherein filter plates are moved for cleaning one after another by means of a chain.

Various kinds of such apparatus have heretofore been proposed but none are found satisfactory as they are rather complicated in construction and expensive in manufacturing.

The object of the present invention is to provide means for moving filter plates automatically in succession in such a way as to bring the moved filter plates into close contact with each other by means of a device of simple construction. With this object in view the present invention provides an automatic filter plate moving apparatus in a filter press, wherein is furnished a chain circulating beneath and parallel to the row of arms attached on either side of filter plates, provided at certain intervals with main pawls having cams co-operable with the arms and auxiliary pawls co-operable with the arms.

According to the present invention, while the chain travels beneath the arms of the filter plate, the cams of the main pawls and the auxiliary pawls go on in contact with the undersurfaces of the enlarged portions of the arms. When one of the cams passes the arm of the foremost filter plate, the main pawl, turning and getting engaged with the arm on either side of the filter plate, begins to carry off the filter plate, and then the auxiliary pawl, getting caught on the enlarged portion of either arm, carries the filter plate along with the main pawl. Then, when the cam of the main pawl comes in contact with the enlarged part of the arm of the movable head or of the already sent filter plate, the main pawl turns and comes off the arm it has so far been holding. After that the filter plate is carried on by the auxiliary pawl only to come in closer contact with the movable head or the filter plate sent last, leaving no gap between.

Other and the further objects of the present invention will become apparent from the following specification and claims taken together with the accompanying drawings in which is shown the preferred embodiment of the automatic filter plate moving apparatus in a filter press according to the present invention.

FIG. 1 is a general plan view of a filter press embodying the present invention;

FIG. 2 is an enlarged sectional view of a main pawl and an auxiliary panel;

FIG. 3 is an elevation view of FIG. 2, showing a main pawl engaged with the arm of a filter plate;

FIG. 4 is an elevation view of FIG. 2, showing the cam of the main pawl and the auxiliary pawl pressed against the undersurfaces of the enlarged portions of the arms of the filter plates, and FIG. 5 is a plan view of FIG. 3.

In FIG. 1, wherein is shown a mechanism for driving the chain according to the present invention, reference numeral 11 indicates a filter plate, provided with an arm 12 on either side thereof. On frames 13 and 14 are fixed side boards 15, and the arms 12 are slidably mounted thereon. Driven by an electric motor 16 and through a transmission mechanism consisting of pulleys 17, 18, a belt 19, a reduction gear 20, sprockets 21, 22 and a chain 23, a driving shaft 24 revolves at a low speed. Sprockets 25 attached to the ends of the driving shaft 24 and sprockets 26 attached to the side boards 15 are engaged with chains 27, each of which circulates beneath and parallel to the row of the arms 12. A movable head 28, fixed to a piston rod 29 of an oil pressure cylinder 30, moves all of the filter plates 11 sent to its side back to their former position for operation by the agency of the oil pressure cylinder 30.

In FIGS. 2–5 is shown the mechanism of the filter plate moving apparatus according to the present invention, with respect to the chain 27 on one side. On two links 31 of the chain 27 at a certain interval is attached a lug 32. Into the lug 32 a pivot 33 is fixedly imbedded and thereon is rotatably set a main pawl 34. The upper end of the main pawl 34 is formed into a hook 35, capable of engaging with the arm 12 by the agency of a spring 36 set on the pivot 33. On the lug 32 is fixed a pin 37 to prevent the rotation of the main pawl 34 by the other end thereof when the hook 35 engages with the arm 12. The main pawl 34 is provided with a cam 38. The arm 12 has an enlarged portion 39 formed at the end thereof. While the chain 27 goes beneath the row of the arms 12, the inclining tip of the cam 38, held down in its position by the enlarged portions 39 of the arms 12, keeps the main pawl 34 turned down against the agency of the spring 36, and allows the hook 35 to go beneath the arms 12. When the main pawl 34 passes the foremost filter plate 11, there is no arm 12 to keep down the cam 38 in its position, so that the main pawl 34 is turned upward by the agency of the spring 36, and the hook 35 engages with the arm 12.

On the lug 32 is rotatably attached an auxiliary pawl 40 with a pin 41, pressed against the enlarged portion 39 of the arm 12 by means of a spring 42. Pins 43 of the chain 27 are provided with rollers 44 to ride on a rail 45 fixed to the side board 15 (FIG. 2). When each chain 27 is driven, the lugs 32 spaced thereon at certain intervals move, with the cams 38 of the main pawls 34 and the auxiliary pawls 40 kept in contact with the enlarged portions 39 of the arms 12 of the filter plates 11. When the cam 38 of one of the main pawls 34 passes the arm 12 of the foremost filter plate 11, there is no enlarged portion 39 of the arm 12 to keep it down, so that the pawl 34 turns upward by the agency of the spring 36, the hook 35 thereof engages with the arm 12 of the foremost filter plate 11, and carries off this filter plate 11. Then, the auxiliary pawl 40 passes the arm 12 of the next filter plate 11, turns upward by the agency of the spring 42, and gets caught on the enlarged portion 39 of the arm 12 of the foremost filter plate 11. In this way the foremost filter plate 11 is sent away both by the main pawl 34 and by the auxiliary pawl 40 working on either side thereof. When the foremost filter plate 11 comes near to a single-sided filter plate 46 fixed to the movable head 28 (if there is no single-sided filter plate 46, the movable head 28 itself is provided with the arm 12) or to an already sent filter plate 11, the cam 38 of the main pawl 34 comes in contact with the enlarged portion 39 of the arm 12 of the single-sided filter plate 46 or of the already sent filter plate 11, so that the main pawl 34 turns down and is disengaged from the arm 12 of the filter plate 11. After this, the filter plate 11 is carried on by the auxiliary pawl 40 only to come into close contact with the single-sided filter plate 46 or the preceding filter plate 11, and then the auxiliary pawl 40, turned down and kept down in its lower position by the enlarged portions 39 of the arms 12, allows the chain 27 to go on.

According to the present invention, when the amount of cake accumulated in the filter plates 11 reaches a certain limit, these filter plates 11 are automatically sent off to the movable head 28 one after another by starting the electric motor 16, dropping down the cake on its way thereto. With the chain 27 circulating on either side of the row of the filter plates 11, provided with the main pawls 34 to be engaged with the arms 12 of the filter plates 11 by means of the cams 38 co-operating with these arms 12, a fully automatic sending of the filter plates 11 can be done through a very simple mechanism. Furthermore, the chain 27 being provided with the auxiliary pawls 40 pressed against the arms 12 by means of the springs 42, each filter plate 11 can be brought into close contact with the single-sided filter plate 46 or the preceding filter plate 11. Providing, without any such auxiliary pawl 40, there is a gap of 10 mm. between every two adjacent filter plates 11, the total amount of the gaps comes to 500 mm. if there are 50 filter plates 11. Thus the use of the auxiliary pawls 40 diminishes the length of the filter press by 500 mm., and, moreover, the shortening of the length between the foremost filter plate 11 and the movable head 28 much increases the efficiency of sending the filter plates 11.

It is thought that the invention and its advantages will be understand from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

Having thus described my invention, what I claim and desire to secure by Letters Patent of the United States is:

1. A filter plate moving apparatus in a filter press comprising a chain circulating beneath and parallel to a row of arms fixed on either side of filter plates, and main pawls having cams co-operable with said arms and auxiliary pawls co-operable with said arms both rotatably attached to said chain at certain intervals.

2. A filter plate moving apparatus in a filter press comprising a chain circulating beneath and parallel to a row of arms fixed on either side of filter plates, main pawls having cams co-operable with said arms and auxiliary pawls co-operable with said arms both rotatably attached to said chain at certain intervals, and enlarged portions formed on said arms co-operable with said cams and said auxiliary pawls.

References Cited

UNITED STATES PATENTS

| | | | |
|---|---|---|---|
| 3,207,315 | 9/1965 | Kurita | 210—230 |
| 3,232,435 | 2/1966 | Fismer | 210—230 |

FOREIGN PATENTS

| | | |
|---|---|---|
| 538,381 | 6/1955 | Belgium. |
| 879,164 | 10/1961 | Great Britain. |
| 934,772 | 8/1963 | Great Britain. |

REUBEN FRIEDMAN, *Primary Examiner.*

C. DITLOW, *Assistant Examiner.*